US008346628B2

(12) United States Patent
Sosikian

(10) Patent No.: US 8,346,628 B2
(45) Date of Patent: Jan. 1, 2013

(54) SEARCHER CALL BACK REQUEST SYSTEM AND METHOD

(75) Inventor: Raffi Sosikian, Glendale, CA (US)

(73) Assignee: Sosbuzz, Inc., Glendale, CA (US)

( * ) Notice: Subject to any disclaimer, the term of this patent is extended or adjusted under 35 U.S.C. 154(b) by 460 days.

(21) Appl. No.: 12/619,310

(22) Filed: Nov. 16, 2009

(65) Prior Publication Data

US 2011/0119121 A1    May 19, 2011
US 2012/0089448 A2    Apr. 12, 2012

(51) Int. Cl.
    *G06Q 30/00*      (2006.01)
(52) U.S. Cl. .................... 705/27.1; 705/26.1; 705/14.23
(58) Field of Classification Search ........ 705/26.1–27.2, 705/14.1–14.73
See application file for complete search history.

(56) References Cited

U.S. PATENT DOCUMENTS

| 2002/0099605 | A1* | 7/2002 | Weitzman et al. .............. 705/14 |
| 2003/0233292 | A1 | 12/2003 | Richey et al. |
| 2006/0253323 | A1 | 11/2006 | Phan et al. |
| 2006/0259427 | A1 | 11/2006 | Randell et al. |
| 2007/0288312 | A1* | 12/2007 | Wang ............................... 705/14 |
| 2008/0301093 | A1* | 12/2008 | Haugen et al. .................... 707/3 |
| 2009/0240561 | A1 | 9/2009 | Altberg et al. |

OTHER PUBLICATIONS

Research and Markets: SEO Strategies for Lawyers: Getting Your Name at the Top of the Search Results When Someone Searches for a Lawyer in Your Specific Area of Expertise. (Nov. 13). M2 Presswire. (Document ID: 1899939101).*
International Search Report and the Written Opinion for International Application No. PCT/US10/55511 dated Jan. 13, 2011.
International Search Report and the Written Opinion for International Application No. PCT/US10/55517 dated Jan. 4, 2011.
Non-final rejection mailed Jan. 31, 2012 in U.S. Appl. No. 12/619,360.

* cited by examiner

*Primary Examiner* — Jeffrey A Smith
*Assistant Examiner* — Resha Desai
(74) *Attorney, Agent, or Firm* — Christie, Parker & Hale, LLP.

(57) ABSTRACT

A search based call back request system enables a user to request a follow up contact from a seller. The system provides search functionality and stores seller information such that when search results appear for sellers that have requested to offer call back service to a buyer, the system formats the search results screen to include a call back request indicator for the seller. The system includes functionality for the user to enter custom call back data.

24 Claims, 6 Drawing Sheets

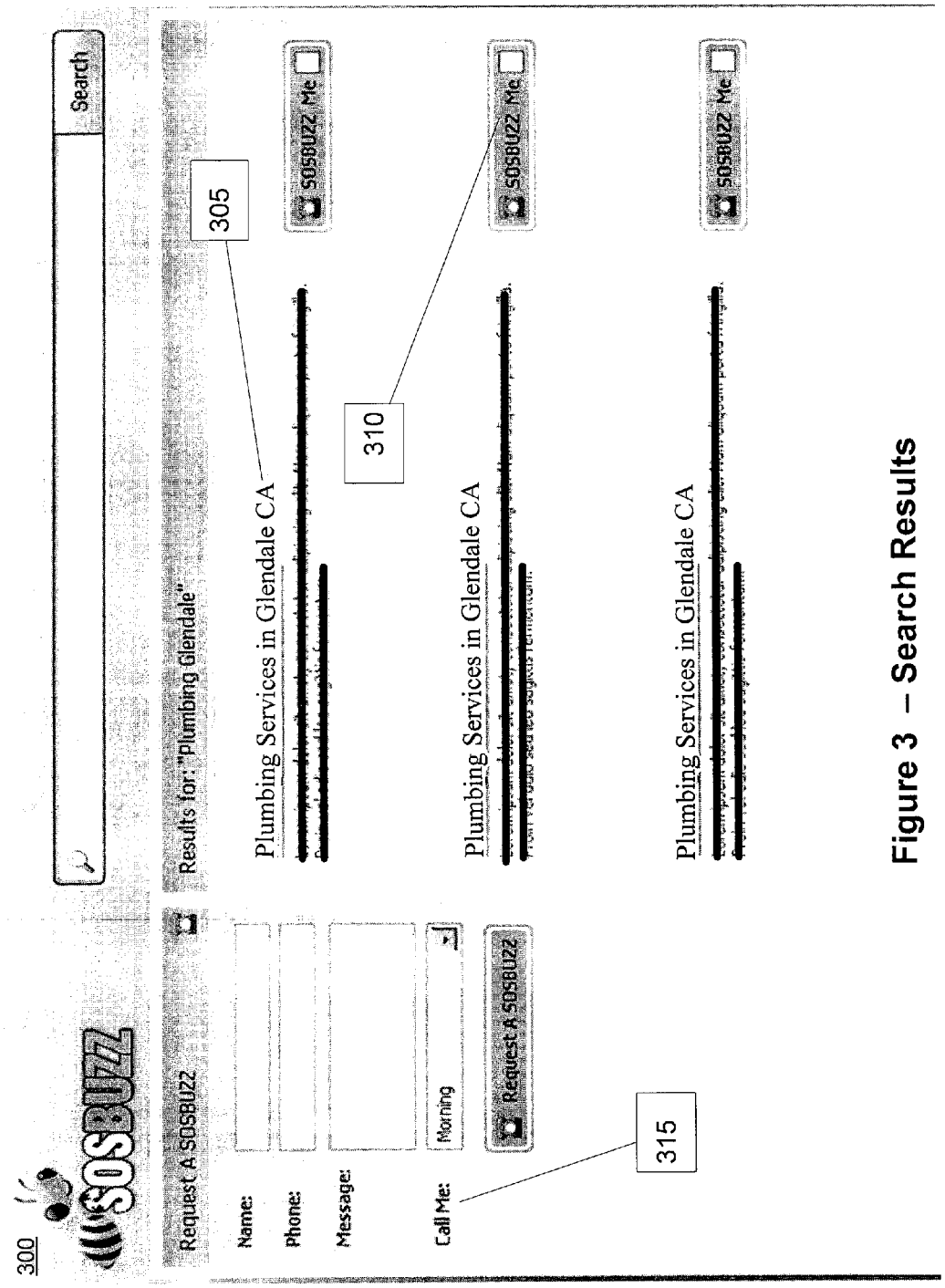
Figure 3 – Search Results

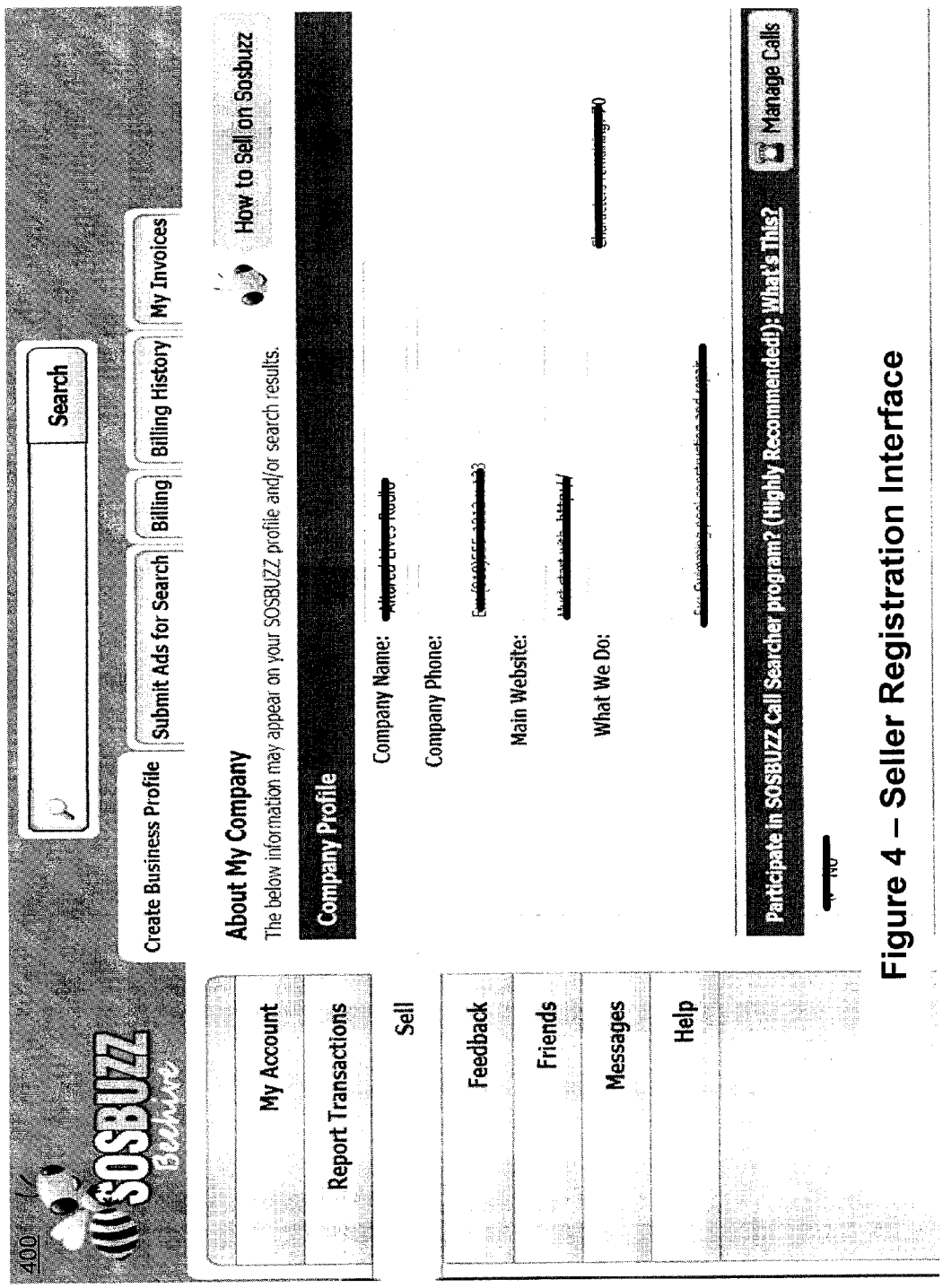
Figure 4 – Seller Registration Interface

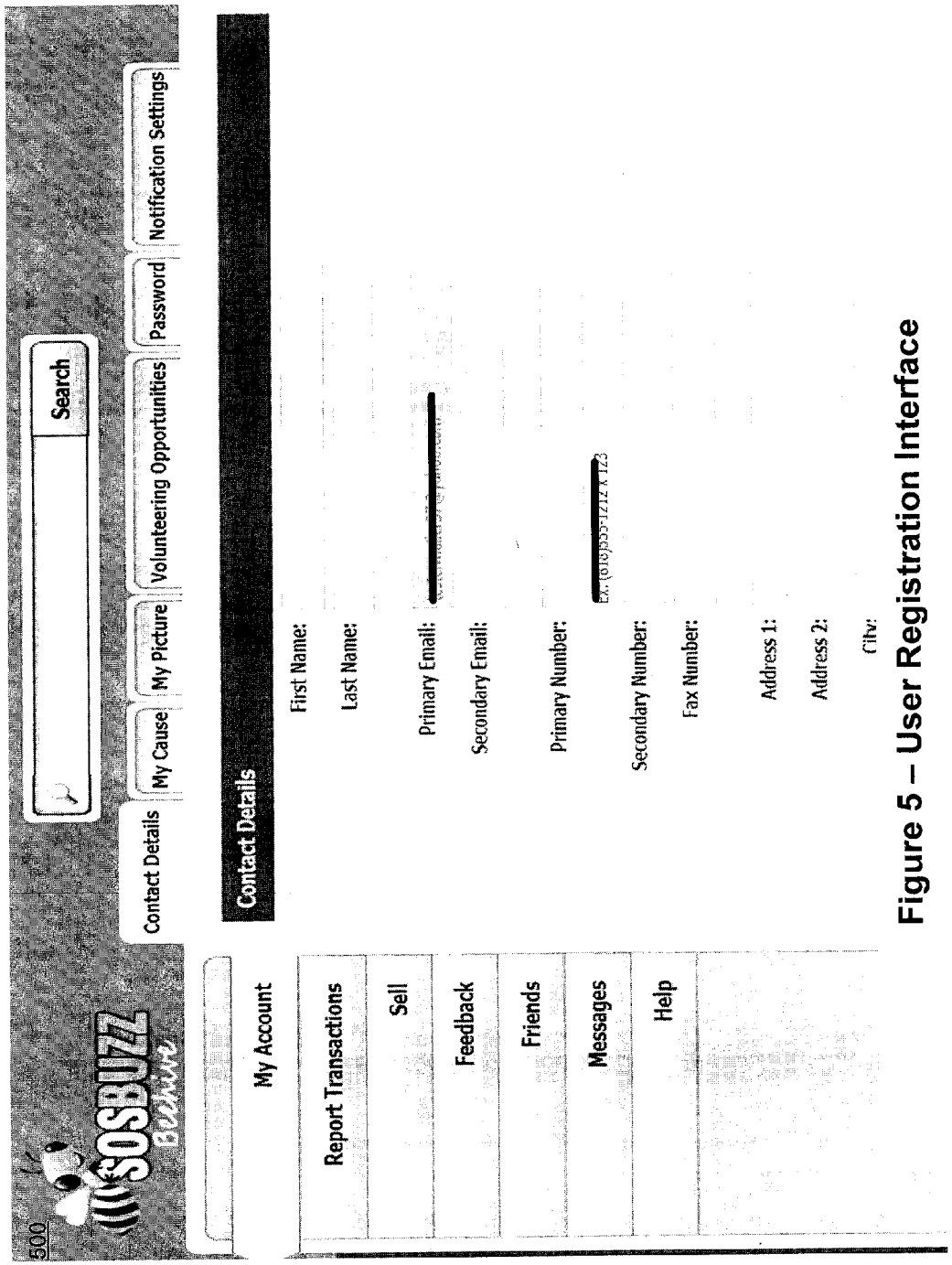
Figure 5 – User Registration Interface

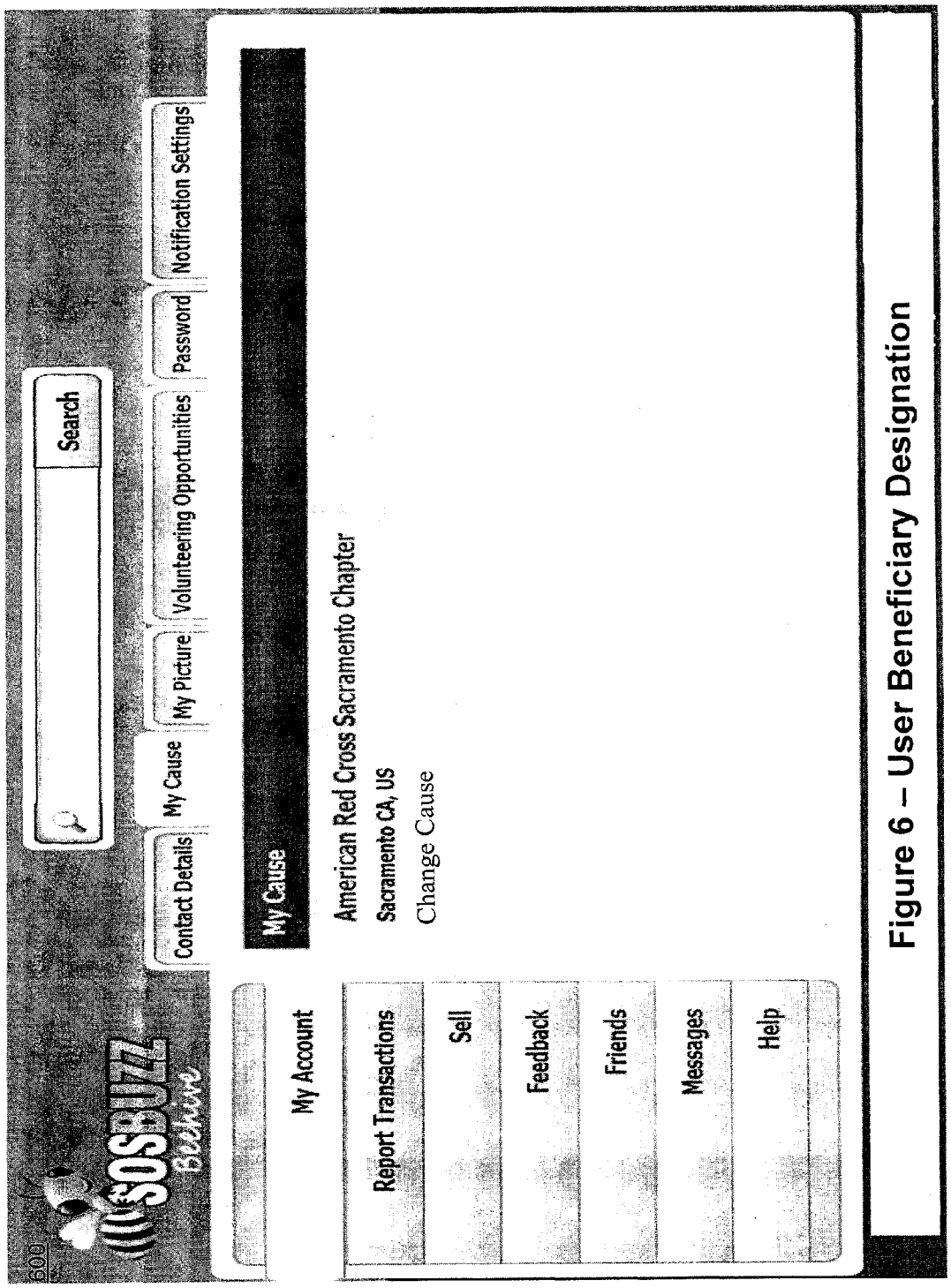
Figure 6 – User Beneficiary Designation

SEARCHER CALL BACK REQUEST SYSTEM AND METHOD

FIELD OF INVENTION

The present invention generally relates to internet searching, and more particularly, to a referral system that connects sellers to buyers via search results.

BACKGROUND OF THE INVENTION

Searching various data sources over a network using a computer (e.g., web or internet searching) has become ubiquitous in today's society. Many companies, such as Google®, provide the ability to enter search conditions and receive search results. Much of the web searching conducted by the typical user is searching for products and services that the user may be interested in purchasing. The search results may include links to a product manufacturer, a retailer and/or product reviews. In many cases, users have become comfortable with accessing information online as part of the decision to purchase a product. However, in some cases, although the user may access product information online, the user may not acquire enough information (e.g., about the product or about the seller) to convince the user to purchase a product.

Many product and/or merchant web sites may include contact information and some provide a mechanism where the seller may request more information. However, typically the search results themselves lack the ability to submit a request for more information. Thus, some users waste time and other resources sifting through and evaluating the enormous amount of information available on individual web sites when more efficient and targeted research and analysis for a prospective purchase could be accomplished by direct contact with a seller.

Thus, a long felt need exists for a searcher call back request system that enables a buyer to perform an internet search and request for a seller, associated with one of the search results, to contact the buyer.

SUMMARY OF THE INVENTION

Methods and systems provide a buyer with a search interface and the ability to request follow up contact from a seller associated with a search result. In general, a buyer conducts a computer based search (e.g., an internet search) for a product or service. The search results are presented on an interface that allows the buyer to make a selection for one or more of the search results. The buyer fills out contact information and may specify other data (e.g., a question about a product, specify the best time for the seller to make contact, etc.). The system routes the request to the seller.

In one embodiment, a server receives a search request from a user and provides a user with search results. The search results are presented in a search result interface (e.g., on a computer running browser software). The search results include multiple items (e.g., goods and/or services) and the interface enables the user to select a call back indicator for one or more of the items. Each of the items is associated with a seller. The user selects the call back indicator for one or more of the search results and submits the call back information. The server receives the user's selection and the call back information. The server determines the seller(s) associated with the items selected for a call back and sends the call back request to associated seller(s).

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

FIG. 3 is a screen layout illustrating an exemplary search results screen, in accordance with an exemplary embodiment of the present invention;

FIG. 4 is a screen layout illustrating an exemplary seller registration interface, in accordance with an exemplary embodiment of the present invention;

FIG. 5 is a screen layout illustrating an exemplary user (e.g., buyer) registration interface, in accordance with an exemplary embodiment of the present invention; and FIG. 6 is a screen layout illustrating an exemplary user beneficiary designation interface, in accordance with an exemplary embodiment of the present invention.

DETAILED DESCRIPTION

The detailed description herein is presented for purposes of illustration only and not of limitation. For example, the steps recited in any of the method or process descriptions may be executed in any order and are not limited to the order presented. For the sake of brevity, conventional data networking, application development and other functional aspects of the systems (and components of the individual operating components of the systems) may not be described in detail herein. Any references to plural may include singular, and any references to singular may include plural.

The systems and methods include a unique combination of one or more features for search based call back request functionality. In one embodiment, the system includes hardware, software, a database and a network connection that receives a user search request and presents search results with a call back indicator associated with at least a subset of the results. The user may request that a seller (e.g., a merchant, a service provider, etc.) associated with one or more of the search results contact the buyer.

As used herein, "entity" may include any individual, buyer, seller, consumer, customer, group, business, organization, government entity, transaction account issuer or processor (e.g., credit, charge, etc), merchant, consortium of merchants, account holder, charitable organization, software, hardware, and/or any other type of entity.

An "account", "account number" or "consumer account" as used herein, may include any code (e.g., one or more of an authorization/access code, personal identification number ("PIN"), Internet code, other identification code, and/or the like), number, letter, symbol, digital certificate, smart chip, or other identifier/indicia suitably configured to allow an entity to access, interact with or communicate with the system.

An "item" may include any good, service, information, experience or anything of value.

A "merchant," "supplier" or "seller" may include any entity that provides goods or services and/or receives payment or other consideration. For example, a supplier may request payment for goods sold to a buyer.

A "buyer" includes any entity that receives goods or services in exchange for consideration. For example, a buyer may purchase, lease, rent, barter or otherwise obtain goods or services from a seller.

A transaction administrator is any entity that receives a transaction fee for services associated with enabling a transaction (e.g., providing search results to a buyer that advertise the products/services of a seller).

Figure 1:
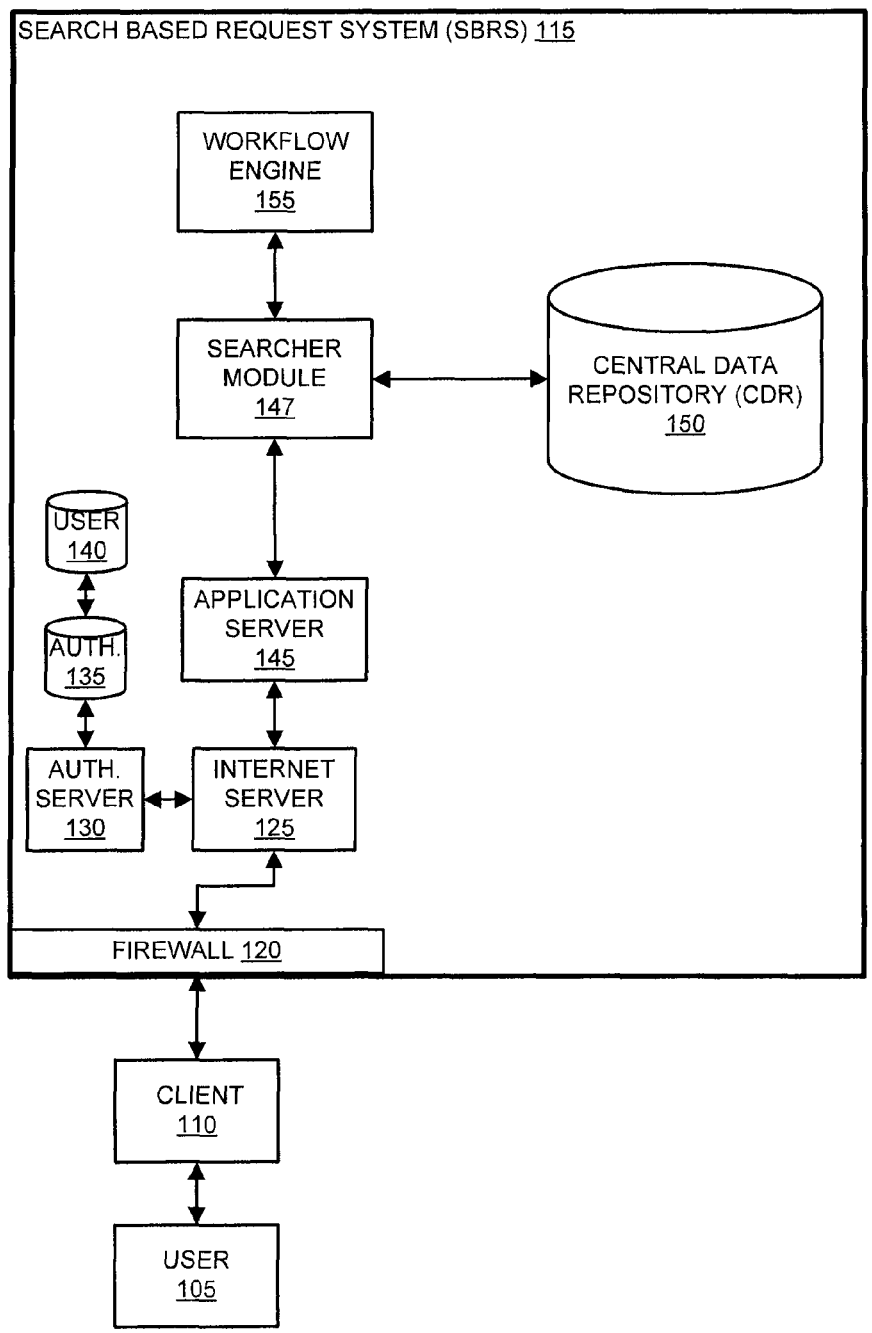
FIG. 1 is a block diagram illustrating major system components for enabling a call search based call back request system, in accordance with an exemplary embodiment of the present invention.

With reference to FIG. 1, in an embodiment, system 101 facilitates a transaction between a buyer (e.g., user 105) and a seller using search based request system (SBRS) 115 through a client 110 with a network connection. In one embodiment, Internet server 120 employs authentication server 130 to validate credentials, assign proper permissions, and retrieve preferences information for authorized users (e.g., buyers and sellers) of SBRS 115.

SBRS 115 is a framework designed to enable improved internet searching, merchant advertising, buyer referral, transaction tracking, and transaction fee payments. SBRS 115 incorporates web-based searching, supports browser-based interfaces and can be easily integrated with existing enterprise solutions. In various embodiments, SBRS 115 may include a variety of software modules and/or logic engines, a central database repository an application sever, etc. Practitioners will appreciate that SBRS 115 and system 101 may incorporate many commonly implemented transaction account charge authorization, account settlement and accounting processes which will not be discussed in detail herein.

In an embodiment, Internet server 120 employs application server 125 to manage various applications and utilities that are utilized by SBRS 115. In various embodiments, Internet server 120 interacts directly with the various systems and components disclosed herein. In an embodiment, internet server 120 is a file server. As one skilled in the art will appreciate, in various embodiments Internet server 120 may comprise a single physical server, multiple physical servers, multiple logical servers, etc. For example, Internet server 120 may include a plurality of web servers that service requests from users 105, acquire and share data (e.g., via CDR 150), etc. System 101 may include any number of computing platforms and databases that may be commonly found within a typical client/server, internet search provider and/or electronic commerce implementation.

Other System 101 components (not shown in FIG. 1) may include, for example, registration systems, management information systems, business information systems, third-party data providers and the like. Each of the systems may be interconnected by a network via any method and/or device described herein. A middleware server (and/or middleware application) may serve as an intermediary between the various systems to ensure appropriate communications between disparate platforms.

SBRS 115, or any other components discussed herein, may further include one or more of the following: a host server or other computing systems including a processor for processing digital data; a memory coupled to the processor for storing digital data; an input digitizer coupled to the processor for inputting digital data; an application program stored in memory and accessible by the processor for directing processing of digital data by the processor; a display device coupled to a processor and memory for displaying information derived from digital data processed by the processor; and a plurality of databases.

As will be appreciated by one of ordinary skill in the art, one or more of the components of system 101 may be embodied as a customization of an existing system, an add-on product, upgraded software, a stand alone system (e.g., a kiosk), a function of another System 101 component, a distributed system, a method, a data processing system, a device for data processing, a computer and/or a computer program product. Accordingly, individual system 101 components may take the form of an entirely software embodiment, an entirely hardware embodiment, or an embodiment combining aspects of both software and hardware. In one embodiment, system 101 hardware component (e.g. a computer) may include a processor, a memory, a communications interface, a network interface, etc. Furthermore, individual system 101 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like. In one embodiment, a system 101 component and/or subsystem comprises a network interface communicating with a memory, the memory communicating with a processor; and the processor, when executing a computer program, configured to accomplish a variety of functions and/or steps.

The system contemplates uses in association with web services (including software as a service or "SaaS"), object access and messaging protocols, utility computing, pervasive and individualized computing, security and identity solutions, electronic commerce, autonomic computing, commodity computing, mobility and wireless solutions, open source, biometrics, grid computing and/or mesh computing.

User 105 may include any buyer or seller that utilizes system 101. In one embodiments, user 105 may utilize SBRS 115 to initiate a transaction or initiate payments to a seller. In various embodiments, user 105 may interface with SBRS 115 via any communication protocol, device or method discussed herein or known in the art. For example, user 105 may interact with SBRS 115 by way of an Internet browser at client 110.

Client 110 comprises any hardware and/or software suitably configured to facilitate requesting, retrieving, sending, receiving, updating, analyzing, entering and/or modifying data. For example, in one embodiment, client 110 is configured to facilitate input, receipt and/or review of information relating to a buyer or a seller and their preferences. Client 110 includes any device (e.g., personal computer) and/or software (e.g., browser applications) which communicates (in any manner discussed herein) with SBRS 115 via any network discussed herein. Such browser applications comprise Internet browsing software installed within a computing unit or system to conduct searches for products and services, review information, conduct or initiate online transactions and/or facilitate electronic communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that client 110 may or may not be in direct contact with SBRS 115. For example, client 110 may access the services of SBRS 115 through another server, which may have a direct or indirect connection to Internet server 120.

As those skilled in the art will appreciate, client 110 includes an operating system (e.g., Windows NT, 95/98/2000, OS2, UNIX, Linux, Solaris, MacOS, Android, Palm OS, iPhone OS etc.) as well as various conventional support software and drivers typically associated with computers. Client 110 may include any suitable mobile device (e.g., a mobile device that includes short messaging service (SMS) functionality), phone, personal computer, network computer, workstation, minicomputer, mainframe or the like. Client 110 can be in a home or business environment with access to a network. In an exemplary embodiment, access is through a network or the Internet through a commercially available web-browser software package.

Client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods. It is noted that the network may be implemented as other types of networks, such as an interactive television (ITV) network.

Client 110 may include any number of applications, code modules, cookies, and the like to facilitate interaction with SBRS 115 in order to, for example, view files, notices, statements, payment status, transaction fee contribution status, and the like. In one embodiment, client 110 may store user 105 preferences and/or any other information disclosed herein on a hard drive or any other local memory device. Accordingly, client 110 may retrieve and store information within a memory structure of client 110 in the form of a browser cookie, for example. In an embodiment, client 110 retrieves information relating to user 105 from CDR 150 on establishing a session with Internet server 120. For example, CDR 150 may store a session ID for a user 105.

Firewall 115, as used herein, may comprise any hardware and/or software suitably configured to protect SBRS 115 components from users of other networks. Firewall 115 may reside in varying configurations including stateful inspection, proxy based and packet filtering among others. Firewall 115 may be integrated as software within Internet server 120, any other SBRS 115 components or may reside within another computing device or may take the form of a standalone hardware component.

Internet server 120 may include any hardware and/or software suitably configured to facilitate communications between client 110 and one or more SBRS 115 components. Further, Internet server 120 may be configured to transmit data to client 110 within markup language documents. As used herein, "data" may include encompassing information such as commands, queries, files, data for storage, and/or the like in digital or any other form. Internet server 120 may operate as a single entity in a single geographic location or as separate computing components located together or in separate geographic locations. Internet server 120 may provide a suitable web site or other Internet-based graphical user interface which is accessible by consumers. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix, MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, AJAX (asynchronous JavaScript+XML), active server pages (ASP), PHP, ZEND Framework, common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g., 123.4.56.789). Internet server 125 retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts.

In order to control access to any component of SBRS 115, Internet server 120 may invoke an authentication server 130 in response to user 105 submissions of authentication credentials received at Internet server 120 from client 110. Authentication server 130 may include any hardware and/or software suitably configured to receive authentication credentials, encrypt and decrypt credentials, authenticate credentials, and grant access rights according to privileges (e.g., pre-defined privileges) attached to the credentials. The authentication server may grant varying degrees of application and data level access to users based on information stored within a database and/or any other known memory structure. Searcher module 147 is a software module that interacts with other AAS 115 components (e.g., invoicing module 146, CDR 150, workflow engine 155, etc) to receive user input, format and execute queries, search seller advertisements, format results, configure web pages, etc.

Workflow engine 155 comprises an automated process execution engine. Workflow engine 155 may comprise one or more software applications, modules or data objects. The software may be any executable code written in any software programming language, such as, for example Java®. For example, in one embodiment, workflow engine 155 reads data from central database repository (CDR) 150 and instantiates a data object (e.g., a Java Bean®) to store the data for use by software modules or other objects.

Authentication database 135 may store information used in the authentication process such as, for example, user identifiers, passwords, access privileges, user preferences, user statistics, and the like. User database 140 maintains user information and credentials for SBRS 115 users (e.g., user 105).

CDR 150 is a data repository that is configured to store a wide variety of comprehensive data. While depicted as a single logical entity in FIG. 1, those of skill in the art will appreciate that CDR 150 may, in some embodiments, consist of multiple physical and/or logical data sources. In one embodiment, CDR 150 stores user profile data, transaction data, content data, historical data, configuration data, geographic data, schedules, security profiles, audit records, predefined rules, process definitions, financial data, and the like.

One skilled in the art will appreciate that system 101 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 101, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of system 101 may consist of any combination thereof at a single location or at multiple locations, wherein each database or system 101 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; seller data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which orates both hardware and software components of such. Communication among the parties in accordance with the present invention may be accomplished through any suitable communication channels, such as, for example, a telephone network, an extranet, an intranet, Internet, point of interaction device (e.g., point of sale device, personal digital assistant, cellular phone, kiosk, etc.), online communications, satellite communications, offline communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The invention may be described herein in terms of functional block components, screen shots, optional selections and various processing steps. It should be appreciated that such functional blocks may be realized by any number of hardware and/or software components configured to perform the specified functions. For example, system 101 may employ various integrated circuit components, e.g., memory elements, processing elements, logic elements, look-up tables, and/or the like, which may carry out a variety of functions under the control of one or more microprocessors or other control devices. Similarly, the software elements of system 101 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 101 may employ any number of conventional techniques for data transmission, signaling, data processing, network control, and/or the like. Still further, system 101 could be used to detect or prevent security issues with a client-side scripting language, such as JavaScript, VBScript or the like.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or, suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, modals (e.g., popup windows), prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, modal, and/or the like. Likewise, there are a number of methods available for modifying data in a web page such as, for example, free text entry using a keyboard, selection of menu items, check boxes, option boxes, and/or the like.

Referring again to FIG. 1, in one embodiment, when user 105 logs onto an application (such as, for example, a buyer logging in to conduct a search, or a seller logging in to review transaction reports and pay transaction feeds) Internet server 125 may invoke application server 145. Application server 145 invokes logic in the Searcher module 147 by passing parameters relating to the user's 105 requests for data. SBRS 115 manages requests for data from Searcher module 147 and communicates with system 101 components. Transmissions between user 105 and Internet server 125 may pass through a firewall 120 to help ensure the integrity of SBRS 115 components. Practitioners will appreciate that the invention may incorporate any number of security schemes or none at all. In one embodiment, Internet server 125 receives requests from client 110 and interacts with various other system 101 components to perform tasks related to requests from client 110.

Internet server 125 may invoke an authentication server 130 to verify the identity of user 105 and assign roles, access rights and/or determine permissions for user 105. In order to control access to the application server 145 or any other component of SBRS 115, Internet server 125 may invoke an authentication server 130 in response to user 105 submissions of authentication credentials received at Internet server 125. When a request to access system 101 is received from Internet server 125, Internet server 125 determines if authentication is required and transmits a prompt to client 110. User 105 enters authentication data at client 110, which transmits the authentication data to Internet server 125. Internet server 125 passes the authentication data to authentication server which queries the user database 140 for corresponding credentials. When user 105 is authenticated, user 105 may access various System 101 applications, functionality and modules along with their corresponding data sources (e.g., CDR 150 and/or various internet data sources and web sites.

System 101 enables user 105 (e.g., a buyer searching for an item to purchase), to improve overall transaction efficiency by utilizing a search-based call back functionality. SBRS 115 provides a platform for trading partners (e.g., buyers and sellers) to interact with each other. The system allows buyers to specify and perform a search for products and services that they may wish to purchase and for sellers to provide increased value to buyers by receiving an automated request directed from the search results screen by a potential buyer.

Figure 2:
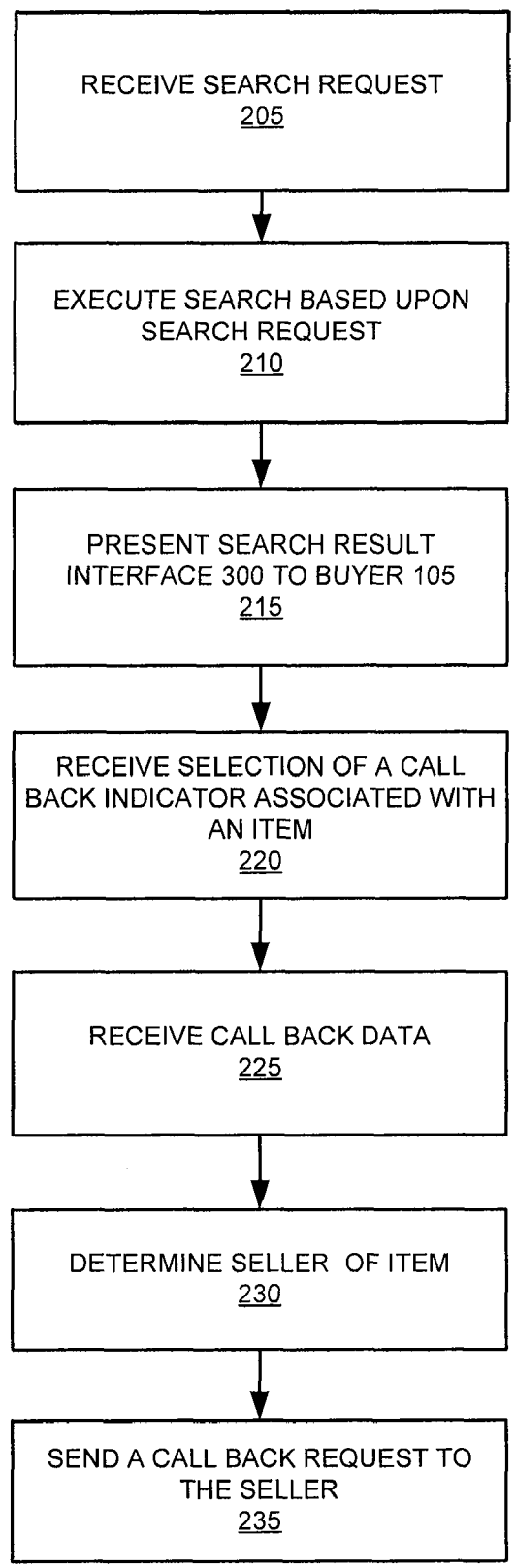
FIG. 2 is a flow chart illustrating an exemplary process implementing search based call back request functionality, in accordance with an exemplary embodiment of the present invention.

With reference now to FIG. 2, SBRS 115 provides internet search and seller call back request notification. In one embodiment, SBRS 115 receives a search request (step 205) and executes a search (e.g., a internet search) based upon the search request (step 210). Searcher module 147 may determine the seller associated with each search result and determines whether the seller is registered to perform call backs. If the seller has registered to be notified of call back requests, searcher module 147 formats the search response with a call back request indicator (e.g., a checkbox) associated with the seller. In an embodiment, searcher module 147 may not determine the seller for each search result and places a call back request indicator next to each search result; i.e., Searcher module 147 may include a call back request indicator next to each search result and determine the seller associated with a result, and whether that seller has elected to be notified of call back requests, when the user selects the corresponding call back request indicator. Furthermore, SBRS 115 and searcher module 147 may be configured only to deliver search results for sellers who have registered to receive a call back request notice.

SBRS 115 presents search results, via internet server 125 and client 110, to user 105. With momentary reference to FIG. 3, a representative embodiment of the call searcher search results interface (300) is illustrated. Search results are presented as rows, or line items (305) and a call back request indicator (310) is associated with search result rows. SBRS 115 receives call back data from the search results interface (300) (step 225). As shown in FIG. 3 the call back data may be entered by the user in an interface (315) that is integrated with the search results interface (300). The call back data may also be collected by a modal window. In one embodiment, the call back data is not entered by user 105 and searcher module 147 retrieves the call back data from the user profile which is stored in CDR 150. The call back data my include any type or amount of data (e.g., email address). For example, as shown in FIG. 3 the user's name, contact phone number, a message, a preferred time to receive a call (315).

Searcher module 147 determines a seller associated with each search result for which user 105 has indicated a call back request (e.g., by clicking a call back request indicator) (step 230). SBRS 115 creates a call back request which includes user's 105 call back data and sends a call back request to the seller (step 235). SBRS 115 may be configured to send messages over a variety of messaging standards such as short messaging service (SMS), multimedia messaging service (MMS), instant messaging (IM) and/or email.

In one embodiment, SBRS 115 implements registration processes (e.g., for a seller or for a buyer) which may include receiving a registration request, presenting a registration interface, receiving registration data, validating the registration data, assigning a user name and sending a registration confirmation. FIG. 4 presents an exemplary interface used by SBRS 115 to collect seller registration data and FIG. 5 presents an exemplary interface for collecting buyer registration data. In an embodiment, the seller and buyer user registration interface is the same interface. In one embodiment, as shown in FIG. 6, the user enters beneficiary data. The user beneficiary may be non-profit and/or charitable organization or may be an account such as a loyalty points account. In one embodiment, the user beneficiary receives value (e.g., monetary value, loyalty points, etc.) based upon a transaction with a seller identified by the search results. In one embodiment, SBRS 115 includes an advertising administration module that enables merchant advertising, buyer referral, transaction tracking and transaction fee payments. Exemplary systems for performing advertising administration are disclosed in U.S. patent application Ser. No. 12/619,360 entitled ADVERTISING INVOICING SYSTEM and filed on Nov. 16, 2009.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and/or C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

The invention claimed is:

1. A method, comprising:
    sorting, by a server, a plurality of items, wherein the plurality of items are associated with a search result and wherein the sorting is based upon at least one of a ranking associated with each respective item in the plurality of items, a price associated with each respective item in the plurality of items, a rate associated with each respective item in the plurality of items and a review associated with each respective item in the plurality of items;
    presenting, by the server and to a user, a call back request interface and a search result interface comprising the plurality of items, wherein the search result interface enables the user to select a call back indicator, presented in the search result interface, for one or more of the plurality of items, and wherein each item in the plurality of items is associated with a seller, wherein each item comprises at least one of a product, a service and the seller;
    receiving, by the server and from the user, a selection of a first call back indicator associated with a first item of the plurality of items;
    receiving, by the server, call back data associated with the user, wherein the call back data associated with the user includes a preferred manner of contacting the user;
    determining, by the server, a first seller associated with the first item; and
    sending, by the server, a call back request to the first seller using the preferred manner of contacting the user, wherein compensation is received from the first seller based upon the sending the call back request to the first seller.

2. The method of claim 1, wherein the call back data associated with the user is input in the call back request interface.

3. The method of claim 1, further comprising, in response to receiving the selection, at least one of presenting a call back request interface to the user and making visible a call back request portion of the search result interface.

4. The method of claim 1, wherein the call back data is received from at least one of a user database, session ID and a cookie.

5. The method of claim 1, further comprising at least one of determining that the first seller is registered to receive the call back request and determining for each item in the plurality of items whether the seller associated with the item is registered to receive the call back request.

6. The method of claim 1, wherein the server comprises at least one of multiple physical web servers and multiple logical servers.

7. The method of claim 1, further comprising, in response to determining that a second seller is not registered to receive the call back request, disabling the call back indicator associated with a second item, wherein the second item is associated with the second seller.

8. The method of claim 1, wherein the call back data comprises at least one of a user name, a user email address, a user phone number and a user message.

9. The method of claim 1, wherein the call back request is sent via at least one of short messaging service (SMS), multimedia messaging service (MMS), instant messaging (IM) and email.

10. The method of claim 1, further comprising receiving a search request from user.

11. The method of claim 1, further comprising determining, by the server, the plurality of items based upon the search request.

12. The method of claim 1, wherein the call back indicator is a check box.

13. The method of claim 1, further comprising providing a registration interface and, in response, receiving registration information from at least one of the first seller and the buyer.

14. The method of claim 13, wherein the registration information for the first seller comprises an indication that the first seller wishes to receive call back requests from potential buyers.

15. The method of claim 13, wherein the registration information for the buyer comprises a selection of an entity to receive a reward.

16. The method of claim 15, wherein the reward is provided by a transaction administrator and the reward comprises a portion of a transaction fee paid to the transaction administrator by the first seller.

17. The method of claim 1, wherein the selection further comprises a selection of a second call back indicator associated with a second item, wherein the plurality of items includes the first item and the second item.

18. The method of claim 17, further comprising determining a seller associated with the second item, wherein the sending the call back request further comprises sending the call back request to the second seller.

19. A tangible computer-readable medium having computer-executable instructions stored thereon that, if executed by a payment management call back request computer, cause the payment management computer to perform a method comprising:
   sorting, by the computer, a plurality of items, wherein the plurality of items are associated with a search result and wherein the sorting is based upon at least one of a ranking associated with each respective item in the plurality of items, a price associated with each respective item in the plurality of items, a rate associated with each respective item in the plurality of items and a review associated with each respective item in the plurality of items;
   presenting, by the server computer and to a user, a call back request interface and a search result interface comprising the plurality of items, wherein the search result interface enables the user to select a call back indicator, presented in the search result interface, for one or more of the plurality of items, and wherein each item in the plurality of items is associated with a seller, wherein each item comprises at least one of a product, a service and the seller;
   receiving, by the computer and from the user, a selection of a first call back indicator associated with a first item of the plurality of items;
   receiving, by the computer, call back data associated with the user wherein the user, wherein the call back data associated with the user includes a preferred manner of contacting the user;
   determining, by the computer, a first seller associated with the first item; and
   sending, by the computer, a call back request to the first seller using the preferred manner of contacting the user, wherein compensation is received from the first seller based upon the sending the call back request to the first seller.

20. A system comprising:
   a network interface communicating with a call back request computer, the computer comprising a memory, a processor and a computer program; and the processor, when executing the computer program, is configured to:
      sort a plurality of items, wherein the plurality of items are associated with a search result and wherein the sorting is based upon at least one of a ranking associated with each respective item in the plurality of items, a price associated with each respective item in the plurality of items, a rate associated with each respective item in the plurality of items and a review associated with each respective item in the plurality of items;
      present, to a user, a call back request interface and a search result interface comprising the plurality of items, wherein the search result interface enables the user to select a call back indicator, presented in the search result interface, for one or more of the plurality of items, and wherein each item in the plurality of items is associated with a seller, wherein each item comprises at least one of a product, a service and the seller;
      receive, from the user, a selection of a first call back indicator associated with a first item of the plurality of items;
      receive call back data associated with the user, wherein the call back data associated with the user includes a preferred manner of contacting the user;
      determine a first seller associated with the first item; and
      send a call back request to the first seller using the preferred manner of contacting the user, wherein compensation is received from the first seller based upon the sending the call back request to the first seller.

21. The method of claim 1, further comprising sending a first invoice to the first seller, wherein the first invoice comprises a transaction fee and wherein the first seller is associated with at least one of the first buyer and the first transaction.

22. The method of claim 21, wherein the first invoice comprises a plurality of transaction fees associated with the first seller.

23. The method of claim 21, further comprising:
   receiving payment based upon the first invoice, wherein the payment comprises the compensation; and,
   in response to the receiving the payment, crediting an account associated with the first seller with a first portion of the payment.

24. The method of claim 14, wherein the registration information for the first seller further comprises an indication of at least one of dates, days of the week and times that the first seller prefers to receive call back requests.

* * * * *